United States Patent [19]

Parks

[11] Patent Number: 4,480,056

[45] Date of Patent: Oct. 30, 1984

[54] ORGANOTIN ANTIFOULING COATINGS WITH NOVOLAC AND BISPHENOL-A EPOXY RESINS

[75] Inventor: Albert R. Parks, Glen Burnie, Md.

[73] Assignee: The United States of America as represented by the Secretary of the Navy, Washington, D.C.

[21] Appl. No.: 278,782

[22] Filed: Jun. 29, 1981

[51] Int. Cl.$^3$ .................. C08L 33/02; A61K 31/74
[52] U.S. Cl. .................. 523/122; 523/428; 525/114; 525/117; 424/78
[58] Field of Search ........... 260/32.8 EP; 525/117, 525/114, 524; 424/78; 523/122, 428

[56] References Cited

U.S. PATENT DOCUMENTS

| | | | |
|---|---|---|---|
| 3,113,036 | 12/1963 | Schwarzer | 525/114 |
| 3,997,499 | 12/1976 | Heilman et al. | 260/33.6 UA |
| 4,097,449 | 6/1978 | Heilman et al. | 525/117 |
| 4,192,929 | 3/1980 | Wingfield, Jr. | 525/117 |
| 4,270,953 | 6/1981 | Nakagawa et al. | 260/37 EP |

Primary Examiner—Joseph L. Schofer
Assistant Examiner—N. Sarofim
Attorney, Agent, or Firm—R. F. Beers; L. A. Marsh; W. W. Randolph

[57] ABSTRACT

An antifouling compound is formed of the esterification product of tributyltin oxide combined with the copolymer of styrene and maleic anhydride. An antifouling coating formulation is prepared by combining the esterification product with a selected blend of Bisphenol-A and novolac epoxies, fillers, pigment, solvent containing a ketone portion, and an amido amine based accelerator.

1 Claim, No Drawings

ORGANOTIN ANTIFOULING COATINGS WITH NOVOLAC AND BISPHENOL-A EPOXY RESINS

BACKGROUND OF THE INVENTION

This invention generally relates to improvements in the formulation and production of marine antifouling compositions and more particularly, to organotin-based antifoulants for epoxy coatings.

In the past, salts and oxides of metals such as copper, zinc, arsenic and mercury have been used in marine antifouling coatings. However, some of these compounds cause corrosion of the metal substrate and degradation of the paint coatings, as well as having a limited service life. Organotin based antifoulants such as tributyltin oxide and tributyltin fluoride have been developed to overcome some of the abovementioned drawbacks with the prior antifoulants. Although the organotin antifoulants are compatible with conventional antifouling coating systems, most coating systems contain various water soluble pigments, fillers and binders so that the antifoulant leaches into the water at an uncontrolled rate. In attempting to control the leaching rate of the antifoulants, various polymeric compounds have been developed as exemplified, for example, by U.S. Pat. Nos. 3,016,369; 3,382,264; 3,930,971; 3,979,354; 4,064,338; 4,075,319; and 4,174,339.

However, the reaction process of combining organotin oxides and hydroxides with various polymeric materials to control leaching, as discussed in the abovementioned patents, is more complex and costly than conventional preparation processes for other antifoulants. For example, the reaction process disclosed in U.S. Pat. Nos. 3,979,354 and 4,075,319 generally involves the esterification of an organotin compound with the acid group of a vinyl polymer. This reaction process not only produces water as a reaction by-product but also involves the sequential use of various solvents which must be removed along with the water to obtain a solids solution. The solids are then dissolved in another solvent to prepare the final coating composition. The process of making organometallic antifoulants envisioned by the present invention eliminates reaction steps disclosed by the prior art by eliminating the production of water by-product and by utilization of polymeric materials and solvents therefore which reduces the number of solvation-distillation steps. It was also found that the particular polymeric materials used to react with the organotin antifoulant exhibits controlled leaching characteristics not contemplated by the prior art.

Epoxy coating formulations are generally exemplified by U.S. Pat. Nos. 3,301,795; 3,417,045; 3,532,538; 3,676,388; and 4,172,177. Although antifoulant materials have been incorporated into the epoxy matrix such as disclosed, for example, in U.S. Pat. No. 3,676,388, problems have been experienced in providing uniform dispersion of antifoulant throughout the coating and controlling the leaching rate of antifoulant therefrom. Also, controlled physical properties are difficult to obtain when incorporating organotin polymers in the epoxy matrix.

SUMMARY OF THE INVENTION

The antifouling coating system of the present invention overcomes drawbacks experienced with the prior art by providing a durable antifouling coating which is simple to manufacture, easy to apply to ship surfaces, and which exhibits a controlled long-term leaching of antifoulant. This is accomplished by initially reacting a copolymer of styrene and maleic anhydride with tri-n-butyltin oxide to form an esterification product. Preferably, one mole of styrene-maleic anhydride is reacted with from 0.4 to 0.8 mole of TBTO to esterify from about 40% to about 80% of the maleic anhydride groups, with the unreacted maleic anhydride groups being utilized to crosslink with compatible epoxy resin types, such as diglycidyl ether of bisphenol A blended with novolac resins. When blended with other compatible coating materials such as selected resins, binders, pigments and fillers, the crosslinked organotin polymer and epoxy blend coating system can be formulated to optimize coating longevity, provide coating strength and durability, and permit easy application.

Accordingly an object of the present invention is to provide an inexpensive method for producing an efficient, long-lasting organometallic antifoulant.

Another object of this invention is the provision of an antifouling composition for preventing biological growths on submerged surfaces for an extended period of time.

A further object of the present invention is to provide an antifouling coating formulation which is durable, non-polluting, and effective in preventing fouling.

Yet another object of this invention is to provide an antifoulant formulation characterized by a controlled, low leaching rate of the antifouling agent from the coating matrix.

DESCRIPTION OF THE PREFERRED EMBODIMENTS

The present invention provides an improved organotin antifoulant coating possessing low leaching, nonpolluting, biological properties which exhibits controlled leaching characteristics when chemically bonded to selected blends of novolac and Bisphenol-A epoxy resins. The resulting organometallic polymers are surface hydrolyzed in sea water to initiate the antifouling action and the organometallic compounds are released at a rate that is dependent not only on the nature of the organometallic polymer but also on environmental conditions such as water temperature, oxygen content, and hydrogen ion concentration. Thus, hydrolysis of the organometallic compounds can be controlled to provide long-term antifouling protection while reducing pollution hazards. Preferably, the organotin compounds are incorporated into a polymeric material through an esterification reaction between the organotin compound and the anhydride functional groups of the polymeric material.

The organotin compounds are of the general form $(R_3Sn)_2O$ where R represents butyl, propyl or phenyl groups with tributyltin oxide being preferred because of its higher toxicity levels towards marine life.

Suitable polymeric resins with which organotin compounds may be chemically combined include thermoplastic polymers, such as vinyl polymers, and thermosetting polymers, such as polyester resins. Preferred polymeric materials comprise copolymers resulting from the copolymerization of $\alpha,\beta$-unsaturated carbonyl compounds, more particularly carboxylic acid anhydrides (ie. maleic anhydride), and alkenes, such as vinylbenzenes (ie. styrene). An example of a preferred compound is the copolymer of styrene and maleic anhydride, as shown below:

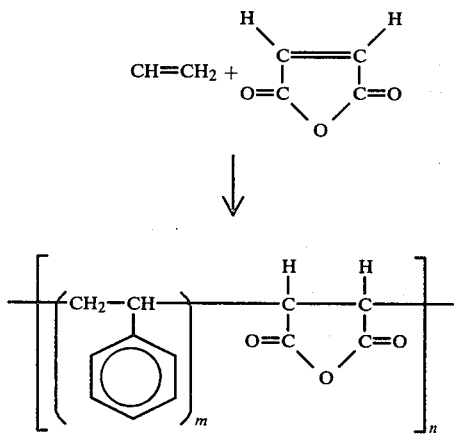

Preferably, m varies from 1 to 3 and n ranges from about 6 to about 8 so that the copolymer provides a means for controlling the uniform distribution of organotin oxide antifoulant throughout the polymer matrix. This particular range of variables was also found to provide good crosslinking between the unreacted maleic anhydride groups (ie. after esterification with tributyltin oxide) and permit controlled leaching of the antifoulant from the coating matrix. Accordingly, the average molecular weight of the styrene-maleic anhydride copolymer should range from about 1600 to about 2500. Commercial styrene-maleic anhydride copolymer is produced by ARCO Chemical Company, a division of Atlantic-Richfield Company under the trademark SMA Resins, characteristic examples of which are set forth below and in a copending U.S. patent application Ser. No. 266,236, filed May 22, 1981 by Albert R. Parks and Stephen D. Rodgers and entitled Organotin-Epoxy Antifouling Coating.

mer serves as an intermediary for interlinking the organotin oxide antifoulant with the epoxy matrix of the coating. Suitable solvents for the esterification process between the styrene-maleic anhydride copolymer and the organotin oxide include aromatic hydrocarbons such as toluene and xylene and super high flash naptha such as manufactured by AMSCO Chemical Co. Since the solvent is not separated from the esterification product before the esterification products are further combined with the selected blends of epoxy resins, the solvent should be compatible therewith. The amount of solvent required for the esterification of tributyltin oxide and the styrene-maleic anhydride copolymer depends upon the viscosity and percent of solids in the final product that is desired, with the solvent ranging generally from about 10% to about 50%, by weight, of the reactants. The esterification process of the styrene-maleic anhydride copolymer and tributyltin oxide antifoulant is shown below:

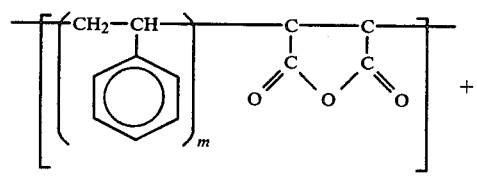

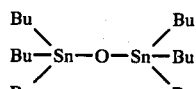

| SMA Resin | Molecular Weight[2] | Melting Range, °C. | Acid No. | Solutions in Aqueous Ammonia | | | |
|---|---|---|---|---|---|---|---|
| | | | | 15% NVM[1] Viscosity (cps.) | Gardner Color | 20% NVM Viscosity (cps.) | 30% NVM Viscosity (cps.) |
| 1000 | 1600 | 150-170 | 480 | 17 | 1-2 | 28 | 50 |
| 2000 | 1700 | 140-160 | 350 | 26 | 1-2 | 136 | 17000 |
| 3000 | 1900 | 115-130 | 275 | 52 | 1 | gel | gel |
| 1440 | 2500 | 55-75 | 175 | 27 | 2 | 88 | 3500 |
| 17352 | 1700 | 160-170 | 270 | 24 | <1 | 50 | 2400 |
| 2625 | 1900 | 135-150 | 220 | 30 | <1 | 350 | gel |
| 3840 | 2300 | 100-120 | 105 | INSOLUBLE | | | |

[1]Non-volatile material
[2]Number average

Other compounds having terminal vinyl groups such as vinylbenzene may be used instead of styrene, and examples of other compatible anhydrides include citraconic anhydride and methyltetrahydrophthalic anhydride. Thus, copolymers such as the maleic anhydride adduct of methylcyclopentadiene, and the copolymer of maleic anhydride and vinyl ether may be used in place of the styrene-maleic anhydride copolymer. The amount of organotin oxide that is combined with the styrene-maleic anhydride resins depends upon the desired degree of esterification of the maleic anhydride groups. Preferably, the degree of esterification of the maleic anhydride groups ranges from about 40% to about 80% with an optimum value of about 60%, wherein the unreacted maleic anhydride groups are utilized to crosslink with the particular epoxy resins of the coating. Thus, the styrene-maleic anhydride copoly-

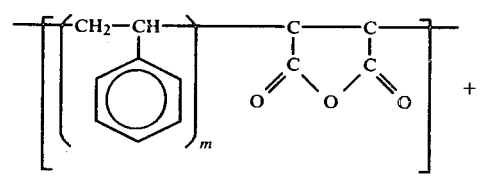

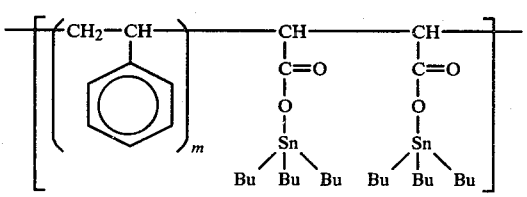

EXAMPLE

Preparation of TBTO and Styrene-Maleic Anhydride Copolymer 404 grams of styrene-maleic anhydride resin (SMA Resin 1000A by ARCO Chemical Co.) was combined with 715 grams of tributyltin oxide (M & T Chemical Co.) and 200 ml. of toluene solvent for 2 to 4 hours with periodic sampling followed by infrared analysis to indicate the extent of esterification. Periodic mixing was performed to maintain the temperature of the mixture between about 60° C. and 110° C. during this period. The final analysis indicated a reaction product which contained the desired proportion of esterification product and unreacted maleic anhydride groups. The final esterification mixture was then combined directly with selected novolac and Bisphenol A type epoxy resins, pigment, and fillers to achieve the desired coating formulation. Prior to applying the epoxy based antifouling coating, an accelerator/initiator is mixed with the coating formulation to initiate the reaction of the epoxy molecules.

One of the two preferred classes of epoxy resins found compatible for combination with the reaction product and byproduct of the esterification of tributyltin oxide and the styrene-maleic anhydride copolymer are epoxy compounds such as 2,2-bis(4,4'-hydroxy-phenyl) propane, often referred to as diglycidyl ether of Bisphenol A. Glycidyl ethers suitable for use in the present coating composition should exhibit viscosities of 16,00 to 20,000 centipoises or less at ambient temperatures and have an epoxide equivalent weight in the range of about 170 to about 700, and preferably between about 175 and 250. The glycidyl ethers are derived from compounds containing one or more hydroxyl groups bonded to the carbon atoms of the aromatic ring structure. These compounds have the general structure

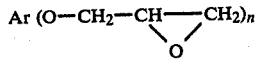

where Ar is representative of the aromatic groups and n varies, for example, from between 2 and 10. The Ar groups can be phenyl or naphthyl radicals which can be bonded directly to one another as in the biphenyl radical. Alternatively, the aromatic ring structures may be separated by alkylene or by other divalent radicals such as hydroxy-phenyl groups as occur in the Bisphenol-A epoxy. Other examples of suitable epoxy compounds include 2,2 bis(4-(2,3 epoxy propyl) cyclohexyl) propane, diglycidyl ether of resorcinol, bis(2-dihydroxynaphthyl) methane, hydroquinone, and bis(4-hydroxyphenyl)-1,1 isobutane. A number of commercially useful diglycidyl ethers of Bisphenol A epoxide resins and oligomers are listed in Chapter 4 of the publication entitled "Handbook of Epoxy Resins" by H. Lee and K. Nevill (McGraw Hill Book Company, New York, 1967).

In accordance with the invention, the other class of epoxy resins are lower molecular weight novolac resins which are normally highly viscous at room temperatures. The blending of the novolac and Bisphenol-A type epoxies utilizes, for example, the structural or coating strength of the novolac resins and the uniform viscosity reduction provided by the Bisphenol-A resins. The epoxy novolac resins are represented by the general formula:

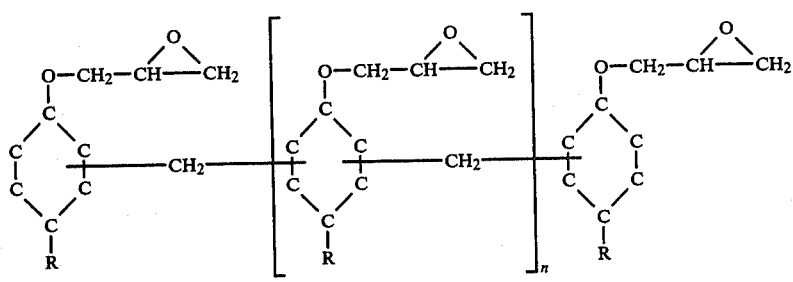

where R is selected from the group consisting of hydrogen and alkyl groups having up to 18 carbon atoms, and n is an integer of from 1 to about 10. Preferably, n should vary from 1 to about 5 and the alkyl group, if present, may be a straight or branched chain. Novolac resins are conventionally produced by condensing phenol with an aldehyde, such as acetaldehyde, chloral, and butyraldehyde, in the presence of an acid catalyst. Illustrative examples of alkylphenols from which the novolac resins may be derived include cresol, butylphenol, tertiary butylphenol, tertiary amylphenol, hexlphenol, 2-ethylhexylphenol, nonylphenol, decylphenol, and dodecylphenol. The epoxidized novolac resin is formed by combing the novolac resins with epichlorohydrin and then adding an alkali metal hydroxide to the mixture so as to effect the desired condensation reaction. Preferably, the viscosity of the novolac resins should range from about 4,000 cps to 70,000 cps with the epoxy equivalent weights ranging from about 172 to about 210. Examples of commercial novolac epoxies include DEN 438 by Dow Chemical Co. and EPN 1138 by Ciba Geigy Co.

Preparation of the antifouling coating is accomplished by mixing together two components "A" and "B" prior to application of the antifouling coating material to the substrate. A stand-in time is allowed prior to application of the antifouling formulation to allow sufficient chemical reaction between the materials in components "A" and "B". Component "A" normally contains the epoxy resin blend (Bisphenol-A and novolac) and the organometallic antifoulant (ie. tributyltin oxide ester of the copolymer of styrene-maleic anhydride in the preparation solvent) and component "B" contains the amido amine based accelerator in a solvent which is compatible with the materials in component "A". A ketone based solvent for component "B" is preferred to produce a partial ketamide complex that blocks or otherwise reduces the reaction rate of the accelerator with the epoxide group. Upon application of the antifouling formulation to a ship surface, the ketone solvent evaporates and the amido amine accelerator reacts with the epoxy groups. Selected fillers, pigments and other materials can be added to component "A" or "B" or the mixture thereof prior to application of the coating.

EXAMPLE 1

|  | Parts (by weight) | Preferred Range (percent by weight) |
|---|---|---|
| Organotin copolymer (tributyltin oxide ester of styrene-maleic anhydride copolymer) | 180 | 25–50 |
| solvent |  |  |
| methyl ethyl ketone | 50 | 7–30 |
| ethyl Cellosolve | 15 | 3–12 |
| Novolac epoxy(EEW about 178) | 25 | 6–10 |
| Bisphenol A epoxy(EEW about 180) | 75 | 18–30 |
| Accelerator (Epi-Cure 855 or Epi-Cure 856) | 40 | 10–20 |
| Filler (ie. Quso WR by Philadelphia Quartz) | 6 | 2–8 |
| Pigment (black pigment, ie. Ravin 8000) | 6 | 2–8 |

(1) EEW is epoxy equivalent weight

In the above formulation, ethyl Cellosolve, which is a glycol ether, provides viscosity reduction of the coating system and extends the pot life of the epoxy resin misture. One example of a lower equivalent weight Bisphenol-A type epoxy is EPON Resin 828, a trademarked product of Shell Chemical Co. having an average molecular weight of about 380 and an average equivalent weight of about 180. Examples of commercial novolac resins include DEN 438, a trademarked product of Dow Chemical Company having an average equivalent weight of 178. The accelerators used in the above formulation are aliphatic amido amines manufactured by Celanese Resin Company under the trademark EPI-CURE. Another compatible filler is fumed silica, such as Cab-O-Sil, a trademarked product of the Cabot Corporation.

EXAMPLE 2

|  | Parts (by weight) | Preferred Range (percent by weight) |
|---|---|---|
| Organotin copolymer (tributyltin oxide ester of styrene-maleic anhydride copolymer) | 180 | 30–55 |
| Solvent |  |  |
| methyl ethyl ketone | 50 | 8–30 |
| ethyl Cellosolve | 15 | 3–12 |
| Novolac epoxy(EEW about 210) | 50 | 8–20 |
| Bisphenol-A epoxy(EEW about 180) | 50 | 12–20 |
| Accelerator (Epi-Cure 855 or Epi-Cure 856) | 40 | 10–20 |
| Filler (ie. Quso WR by Philadelphia Quartz) | 6 | 2–8 |
| Pigment (black pigment ie. Ravin 8000) | 6 | 2–8 |

Preferred curing agents for the antifouling formulations include aliphatic amido amines, such as EPI-CURE 855 and 856 by Celanese Resins; aromatic amines such as EPI-CURE 8494; and tertiary amines such as trisdismethylaminomethylphenol. Aliphatic polyamines include polyalkylene amines such as diethylene/triamine, triethylene/tetraamine, and tetraethylene. Other useful amines include ethylene diamine, tetramethylene diamine, hexamethylene diamine, xylylene diamine, and the like.

Obviously many modifications and variations of the present invention are possible in light of the above teachings. It is therefore to be understood that within the scope of the appended claims the invention may be practiced otherwise than as specifically described.

What is claimed:

1. A marine antifouling coating formulation consisting essentially of, by weight:
    from about 20% to about 55% of the esterification product produced by reacting tributyltin oxide with a copolymer of styrene and maleic anhydride, wherein about 0.4 to about 0.8 moles of said oxide are combined with each mole of said copolymer;
    from about 7% to about 36% solvent;
    from about 12% to about 32% of a diglycidyl ether of Bisphenol-A epoxy having an average epoxy equivalent weight of between about 170 and 250;
    from about 6% to about 30% of a novolac type epoxy having an average epoxy equivalent weight of between about 170 and 215;
    from about 10% to about 20% of an amido amine accelerator;
    from about 2% to about 8% filler; and
    from about 2% to about 8% pigment.

* * * * *